United States Patent [19]
Wambeke

[11] Patent Number: 5,776,277
[45] Date of Patent: Jul. 7, 1998

[54] ENVIRONMENTAL SEALING

[75] Inventor: Alain Wambeke, Zoutleeuw, Belgium

[73] Assignee: N.V. Raychem S.A., Kessel-Lo, Belgium

[21] Appl. No.: 702,691

[22] PCT Filed: Feb. 24, 1995

[86] PCT No.: PCT/GB95/00383

§ 371 Date: Dec. 2, 1996

§ 102(e) Date: Dec. 2, 1996

[87] PCT Pub. No.: WO95/23448

PCT Pub. Date: Aug. 31, 1995

[30] Foreign Application Priority Data

Feb. 28, 1994 [GB] United Kingdom ............... 9403838

[51] Int. Cl.⁶ .................................................. B65H 69/00
[52] U.S. Cl. ................... 156/158; 156/52; 156/221; 156/86; 403/273; 403/298
[58] Field of Search ................ 156/48, 158, 52, 156/221, 86; 403/273, 298; 439/210

[56] References Cited

U.S. PATENT DOCUMENTS

| | | | |
|---|---|---|---|
| 4,736,071 | 4/1988 | Hawkins et al. | 156/48 X |
| 4,784,707 | 11/1988 | Wefers et al. | 156/48 |
| 4,888,070 | 12/1989 | Clark et al. | 156/48 |

FOREIGN PATENT DOCUMENTS

| | | |
|---|---|---|
| A0 265 259 | 4/1988 | European Pat. Off. . |
| A0 368 493 | 5/1990 | European Pat. Off. . |
| A33 36 456 | 4/1985 | Germany . |
| U93 11 800 | 1/1994 | Germany . |
| A92 19034 | 10/1992 | WIPO . |

*Primary Examiner*—Francis J. Lorin
*Attorney, Agent, or Firm*—Herbert G. Burkard

[57] ABSTRACT

A device capable of co-operating with an outer pressure member to form a sealing block between two or more elongate substrates and a hollow housing within which the substrates extend, the device comprising i) an elongate support member and
ii) two or more elongate flexible leaves each of which comprises a sealing material that (a) is not heat fusible, (b) is secured relative to the support member, and (c) extends laterally of the elongate support member, the device being positioned, in use, between the elongate substrates, so that a first of the flexible leaves extends at least part of the way around the periphery of a first of the elongate substrates, and a second of the flexible leaves extends at least part of the way around the periphery of a second of the elongate substrates, so that in co-operation with the action of the outer pressure member acting inwardly on the substrates and the device, and outwardly onto the housing, a sealing block is made between the elongate substrates and the housing.

12 Claims, 7 Drawing Sheets

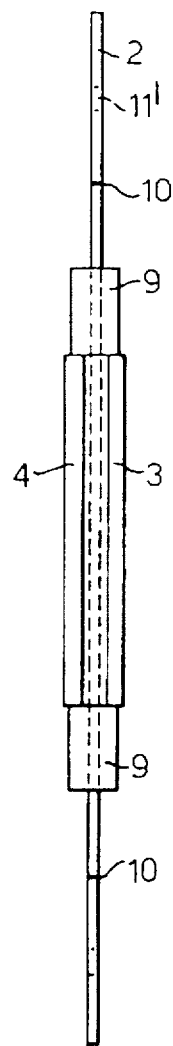
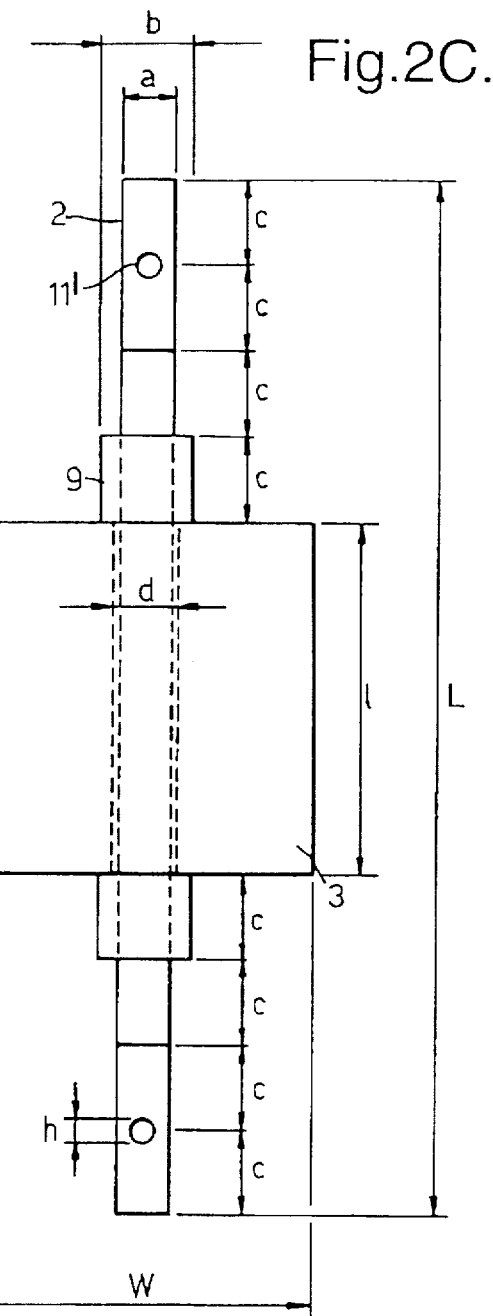
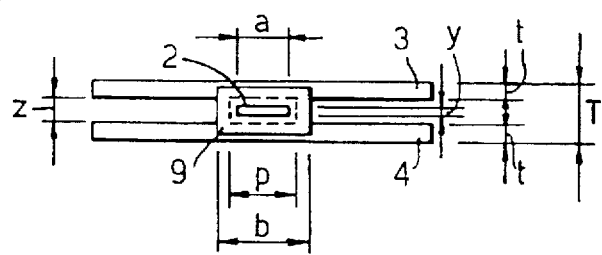

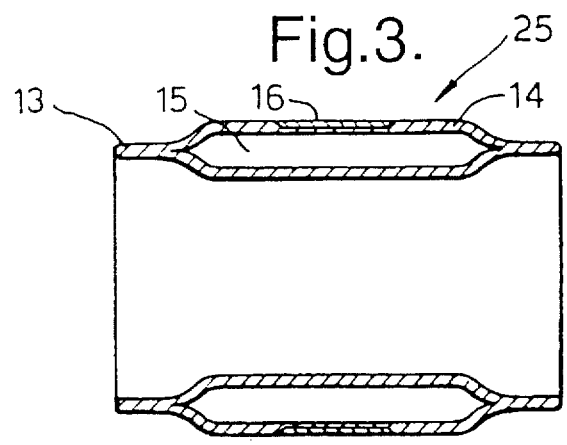
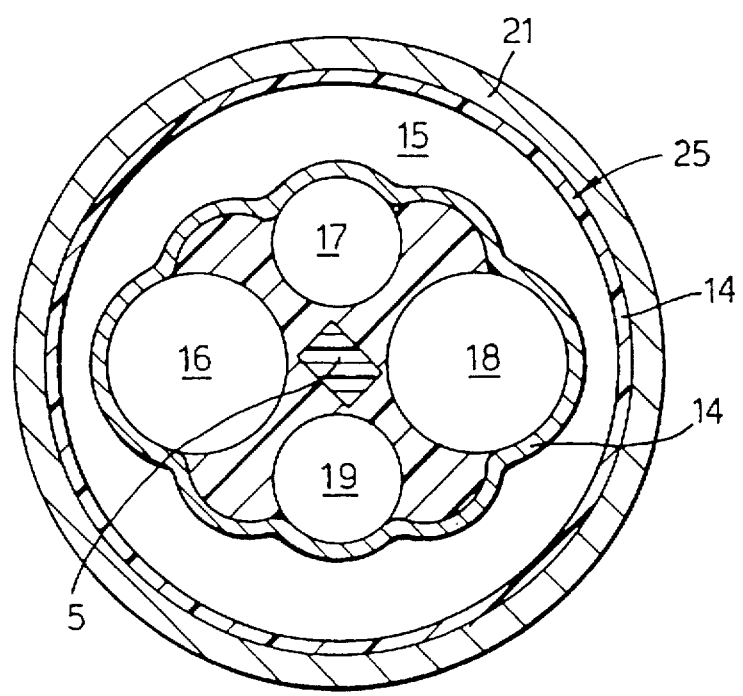

Fig.4I.

ENVIRONMENTAL SEALING

BACKGROUND OF THE INVENTION

This invention relates to a device for sealing between two or more elongate substrates, such as cables or pipes, and a hollow housing surrounding the elongate substrates. Particular applications where the present invention is useful include sealing of cables or pipes within a duct or within a splice case. The invention will be described primarily in terms of a duct seal, (which term includes "feed throughs") but the invention is also applicable to other instances of sealing, including splice cases, pipe protection and grommets. The invention particularly relates to a device for forming a seal between two or more elongate substrates and a housing, particularly where there are a plurality of substrates. Thus the invention is particularly suitable for sealing between multiple cables in a duct, or between cables at a cable branch out in a cable splice.

Where there are a number of elongate substrates extending in a housing, for example, in a duct, or in a splice case, it is necessary not only to seal between the outer facing surfaces of the substrates and the housing within which they sit, but also to seal the gaps between the elongate substrates themselves. In the prior art of splice cases, it is well known to use some kind of thermally responsive material, for example a heat fusible material, positioned between two or more cables exiting a splice case housing to form a seal between the cables.

U.S. Pat. No. 4,095,044, for example, describes a splice case for receiving a plurality of cables, the splice case comprising two half shells forming an outer housing and an adapter at each end of the housing shaped to accept two or more cables. The adapter comprises a thermally responsive material, e.g. a heat fusible material and includes longitudinal channels to receive incoming cables. It also comprises thermally conductive sheets of e.g. copper which can transfer heat from heaters located in the outer housing to the thermally responsive sealant. A single adapter is used regardless of the number of cables to be sealed, the adapter being differently shaped and sized depending on the number of exiting cables.

Other patent specifications which disclose the use of an adapter, positioned between cables at a branch out, and comprising a thermally responsive material, e.g. a heat fusible material, which fuses to seal around the cables, are GB-A-2198594, GB-A-222737 and U.S. Pat. No. 4,095,044.

The adapters described above in the prior art specifications are generally used in conjunction with a heat shrinkable sleeve or housing, the heat applied to shrink the sleeve also acting to activate the thermally responsive material.

It is also known to use a flexible hollow inflatable envelope to seal a gap between cables passing through a duct and the duct walls themselves. This is described for example in WO 92/19034 which describes an inflatable envelope, the envelope being inflated in use by introducing a pressurising medium into the envelope through a hole in the walls of the envelope by means of a probe passing through the hole, and a gel material being provided to seal that hole on withdrawal of the probe. This inflatable envelope may be used to form a seal between a single cable passing through a duct by wrapping the envelope around the cable, inserting the envelope-wrapped cable into the duct, and then inflating the envelope. Similarly for two cables in the duct, or in a splice, two of the said envelopes can be wrapped around the cables, and between the cables before inflation.

SUMMARY OF THE INVENTION

The present invention provides another device suitable for use for sealing between cables in a duct, or in a splice cable, for example, where there are two or more cables.

The present invention provides a device capable of cooperating with an outer pressure member to form a sealing block between two or more elongate substrates and a hollow housing within which the substrates extend, the device comprising i) an elongate support member and ii) two or more elongate flexible leaves each of which comprises a sealing material that (a) is not heat fusible, (b) is secured relative to the support member, and (c) extends laterally of the elongate support member, the device being positioned, in use, between the elongate substrates, so that a first of the flexible leaves extends at least part of the way around the periphery of a first of the elongate substrates, and a second of the flexible leaves extends at least part of the way around the periphery of a second of the elongate substrates, so that in co-operation with the action of the outer pressure member acting inwardly on the substrates and the device, and outwardly onto the housing, a sealing block is made between the elongate substrates and the housing.

The term "not heat fusible" is used to distinguish the sealing material used in the present invention from the thermally responsive, heat sealable adhesives used in the prior art mentioned above. The non-heat fusible material used in the present invention is preferably flowing well at about 110° C. to 120° C., and is sufficiently flowed at about 60° C. to 70° C. to stick to itself. A particularly preferred material is a mastic. Preferably the material has a TMA (thermo mechanical analysis) behaviour similar to that shown in the graph of FIG. 7. Preferably the material exhibits a 10% dimensional change at a temperature in the range 100° C. to 150° C., preferably 105° C. to 130° C., preferably about 110° C. to 120° C., when subjected to TMA testing.

Where we say that "a sealing block" is made between the elongate substrates and the housing, we mean that passage of contamination, for example, moisture through the sealing block around the cables is not possible. There is not necessarily, however, a complete seal across any given cross-section of the housing containing the substrates, the installed device and the outer pressure member.

Preferably the elongate support member of the device is in the shape of a strip, and two flexible leaves of sealing material are provided, bonded respectively to the first and second major surfaces of the strip. The leaves of sealing material preferably comprise of material having a high compression set. Particularly suitable materials for the leaves of sealing material are a mastic, a gel, or a rubber.

Mastic is particularly suitable as the material for the leaves of the device. This is advantageously a material with a high compression set, but also having minimum creep properties. An advantageous property of the material of the leaves of the device is that during installation of the device and its cooperation with the outer pressure member to form a seal, the material is able to flow easily, and be compressed between the elongate substrates, but after some time the material is stable, does not creep, and has a high mechanical strength. The preferred material is a mastic, preferably a mastic which has a softening point (when measured according to ASTM E28) of 129° C., and when subjected to a rolling drum peel test at 23° C. (according to test QAPK 027) has a peel strength of 130N/25 mm. The preferred mastic also has a sheer strength (when tested according to ISO4587) of greater than 160N preferably greater than 250N. Mastics suitable for this invention have high, generally 100%, compression set. This facilitates the easy flow of the leaves during installation of the device. A preferred mastic, when tested according to ASTM D1321 needle penetration test (5 second, 50 gr) shows a needle penetration of 25–35 ($\times 10^{-1}$ mm), especially about 28 ($\times 10^{-1}$ mm), or a needle penetration of 35 to 45 ($\times 10^{-1}$ mm), especially about 40 ($\times 10^{-1}$ mm), and when tested according to ASTM D1321 needle penetration test (5 sec, 100 gr test) shows a needle penetration of 35 to 45 ($\times 10^{-1}$ mm), especially about 40 ($\times 10^{-1}$ mm), or about 55 to 65 ($\times 10^{-1}$ mm) especially about 60 ($\times 10^{-1}$ mm).

The mastic leaves preferably have a thickness of about 2 to 4 mm, preferably about 3 mm.

For the material of the leaves of the device a mastic may be used as described above or, for example, a mastic may be replaced or supplemented by a gel. A gel may be formed by oil-extension of a polymeric material. The polymeric material may be cross-linked. I prefer that the gel has a hardness at room temperature as determined using a Stevens-Volland Texture Analyser of greater than 45 g, particularly greater than 50 g especially greater than 60 g. It preferably has a stress-relaxation less than 12%, particularly less than 10% and especially less than 8%. Ultimate elongation, also at room temperature, is preferably greater than 60%, especially greater than 1000%, particularly greater than 1400%, as determined according to ASTM D638. Tensile modulus at 100% strain is preferably at least 1.8, more preferably at least 2.2 MPa. In general compression set will be less than 35%. Suitable gels may be made by extending with an oil block copolymer having hard blocks and rubbery blocks. Examples include triblock copolymers of the styrene-ethylene-butylene-styrene type (such as those known by the Shell Trade Mark Kraton, eg G1650, 1651 and 1652). The amount of block copolymer may be, say from 5–35% of the total weight of the gel, preferred amounts being 6–15%, especially 8–12%. The amount of copolymer, and its molecular weight may be varied to give the desired physical properties such as hardness.

The device according to the invention co-operates with an outer pressure member in order to form the said sealing block. The outer pressure member preferably exerts a pressure of about 2 to 4 bar, preferably about 3 bar pressure.

A second aspect of the present invention, therefore comprises a kit of parts comprising one or more devices according to the first aspect of the invention and an outer pressure member. This outer pressure member is a hollow member in which the device and the substrates to be sealed can be positioned. The outer pressure member can be activated by any suitable means to exert an inwardly directed pressure.

Any suitable outer pressure member, which can provide an inwardly directed pressure on the device and the substrates, and an outwardly directed pressure on the housing, is suitable. For example a foam, especially one caused to foam by mixing two components. Particularly preferred however is the flexible hollow sealing member described in WO 92/19034, referred to above. The entire disclosure of WO 92/19034 is incorporated herein by reference. Similar articles are also described in WO 93/03302 and in PCT application PCT/GB93/01810, the entire disclosures of which are also incorporated herein by reference.

The invention also provides a method of forming a sealing block between two or more elongate substrates and a hollow housing using the kit according to the second aspect of the invention, the method comprising:

(i) securing the device(s) to a first substrate so that a first flexible leaf of the device surrounds at least part of the periphery of a first substrate, then (ii) sliding the device relative to the first substrate into the outer pressure member within which the other substrate (s) are already present, so that a second leaf surrounds at least part of the periphery of a second substrate, (iii) positioning the assembly formed in (ii) into the housing, and (iv) causing the outer pressure member to exert an inward pressure onto the assembly formed in (ii) and an outward pressure onto the housing, thereby effecting a sealing block between the substrate(s) and the housing.

Preferably the device of the invention is such that prior to step (iv) each of the leaves of the device extends only part of the way out to the outer pressure member, but after step (iv) it extends out to the outer pressure member.

Although the device of the invention is said to comprise two or more elongate flexible leaves, it is most preferred that the device comprises only two elongate flexible leaves, each of which extends laterally of the elongate support member to both sides thereof. A major advantage of the invention is where the device is to be used to form a sealing block in situations where there are many substrates within a housing, for example, five or more substrates, this can be achieved simply by using two or more of the said devices that only comprise two flexible leaves each. This is best seen with regard to the specific embodiments described later. The possibility of using the same type and size of device for sealing between from two to many, e.g., seven or more, simply by using more of the device according the invention reduces inventory compared to solutions described in the prior art patents described earlier such as U.S. Pat. No. 4,095,044, where a different design of adapter was required at the branch area depending on the number of cables exiting the splice case.

The leaves of the device of the invention are preferably covered with a release layer, for example a release paper. This is particularly relevant where, as is often preferred, the sealing material has a tacky outer surface. For the preferred case of a two-leafed device, preferably there are two release papers. Preferably a first release paper extends from the central support member to one side of that support member between the leaves and then bends back over the outer facing surface of the first of the leaves of the device. The second release paper, in a similar fashion, extends from the opposite side of the central support member between the two leaves, and then also bends back on itself over the outer surface of the second of the leaves. This makes for particularly easy removal of the release papers for installation of the device. It also permits a step wise removal of the release paper.

Preferably the length of each of the leaves of the device is in the range 50 to 70 mm, especially about 60 mm, and the width of each of the leaves is between 30 and 70 mm, preferably either about 40 mm, or about 60 mm, depending on the application.

The method according to the invention as described above is a particularly simple and easy way to install the device. Preferably the device is provided with tie attachments to fix it to a first of the substrates, and hence to minimise unintentional movement of the device relative to the substrates during installation.

When the release layers are removed, the uncovered surfaces are preferably sprayed with a lubricating liquid to facilitate insertion of the device between the elongate substrate. This is described with reference to the specific embodiments later.

BRIEF DESCRIPTION OF THE DRAWINGS

Embodiments of the invention will now be described by way of example with reference to the accompanying drawings wherein FIGS. 2B is a side view of the device of FIGS. 1 and 2 showing the construction of the device, FIGS. 2C, and 2D are side and end views of the device shown in FIG. 2B showing the relative dimensions of the device, FIG. 3 shows an outer pressure member as used with the devices of FIGS. 1 and 2 to form a seal according to the invention, FIGS. 4A–4I show a series of nine steps illustrating installation of the device of FIGS. 1 and 2 between multiple cables extending out of the outer pressure member shown in FIG. 3.

FIG. 5 is an end view of the device of FIGS. 1 and 2 and the outer pressure member of FIG. 3 used to seal between multiple cables positioned within a duct.

DESCRIPTION OF THE PREFERRED EMBODIMENTS

Figure 1:
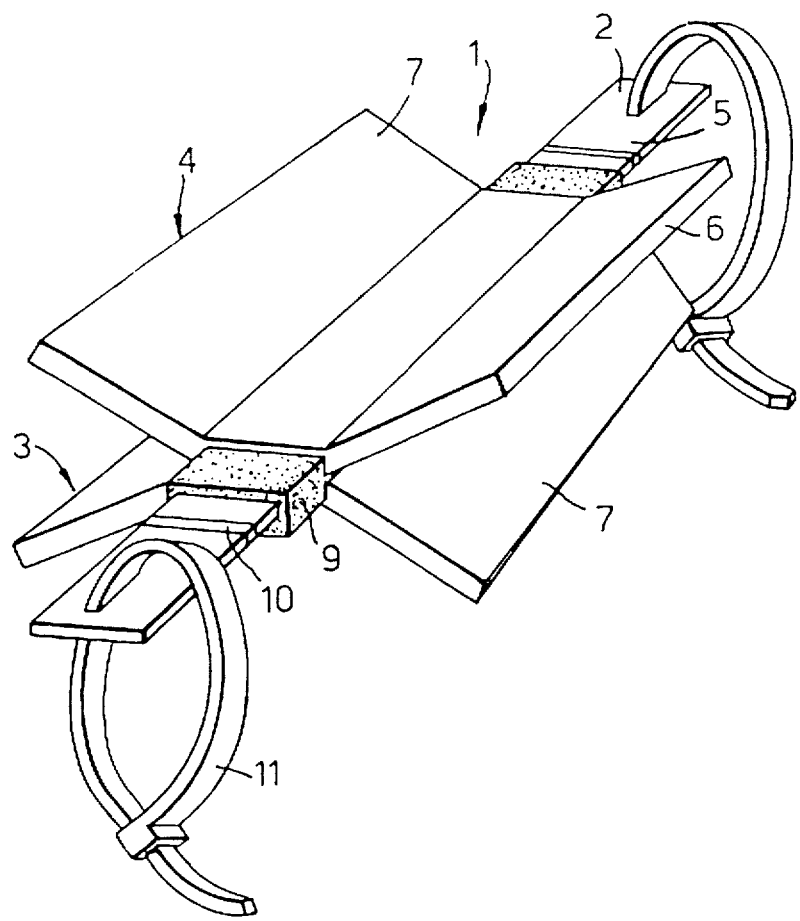
FIG. 1 is a perspective view of a device according to the present invention.

Referring to the drawings, FIG. 1 shows a device 1 according to the invention comprising an elongate support member 2 that is a plastic strip having a thickness of about 2 mm, a width of about 10 mm, and a length of about 150 mm. Secured eg bonded, relative to the plastic strip 2, on flat surfaces thereof, and extending over a central length of the plastic strip of about 60 mm, are mastic leaves 3 and 4. Each mastic leaf is secured to an opposite major surface of the plastic strip 2. Furthermore, each plastic leaf 3, 4 comprises a central portion 5 secured to the plastic strip 2 and lateral flaps 6 and 7 extending laterally from the plastic strip 2. The surface of each mastic leaf 3 and 4 is covered by a release paper 8 (this is best seen in FIG. 2). At either end of mastic leaves 3, 4 are positioned barriers in the form of foam blocks 9 which act to minimise movement of the mastic leaves, in use, longitudinally of the plastic support strip 2. The plastic support strip 2 also includes marker lines 10 which are used during installation of the device to indicate the correct installation position of an outer pressure member. Finally the device of FIG. 1 includes tie wraps 11 secured to the plastic support strip 2 of the device. These are also used during installation of the device, acting to secure the device to one of the cables exiting from a duct to avoid relative movement between the device and the cable. The width W of the mastic leaves of the device are, for example, 40 mm or 60 mm, depending on the size of the cables and the size of the outer pressure member with which the device is used. A width of about 40 mm is preferred for use with an outer pressure member of diameter (in installation position) about 60 to 80 mm, and a width of about 60 mm is preferred for use with an outer pressure member of diameter (in installation position) greater than about 80 mm.

FIG. 2B is a side view showing the construction of the device. The plastic strip 2, bearing the locating mark 10, and containing a hole 11' for fixing to the tie wrap 11, extends through the device. On it is mounted foam dams 9. Centrally can be seen mastic leaves 3 and 4.

Figure 2A:
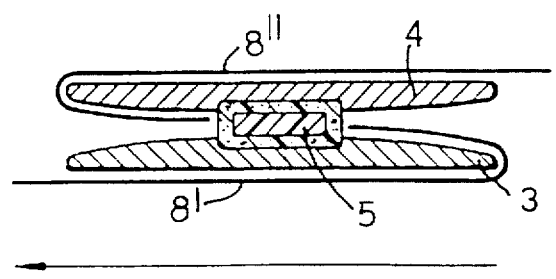
FIG. 2A is an end sectional view through the device of FIG. 1, showing in particular the position of the release paper covering the mastic leaves.

FIGS. 2C and 2D are plan and end views respectively of the device of FIG. 2A to illustrate the relative dimensions of a preferred embodiment according to the invention. The plastic strip 2 has a width "a" of 10 mm, and the foam dams 9 have a width "b" of 16 mm. The diameter "h" of the hole in the plastic strip 2 is 4 mm. The distance between each of the end of strip 2, the hole 11' in strip 2, the end of foam dam 9 and the end of mastic leaves 3, 4 is "c", which in each case is 15 mm. The width within the mastic leaves 3, 4, either side of strip 2 is "d" which is 12 mm. The length "l" of the mastic leaves 3, 4 is 60 mm, and the overall length "L" of the plastic support strip 2 is 180 mm. The width "W" of the mastic leaves 3, 4 is either 40 mm or 60 mm, as described above with reference to FIG. 2A.

Looking now at FIG. 2D, the support strip 2 has a thickness "y" of 2 mm, and the mastic leaves 3, 4 have a thickness, "t" of 3 mm. The distance between the inner surfaces, (in the short direction) of the foam dam 9, and between the inner faces of mastic leaves 3 and 4 is "z" which is 4 mm. The distance between the inner surfaces (in the long direction) of the foam dam 9 is "p" which is 12 mm. The overall thickness of the device is "T" which is 10 mm.

FIG. 3 shows an outer pressure member 25 which may be used with the device of FIGS. 1 and 2 to form a seal between, for example, a duct and a number of cables passing through the duct. The outer pressure member 25 in FIG. 3 comprises a flexible sealing envelope 13 with preferably non-stretchable walls 14 between which a pressurising fluid such as air 15 can be introduced. An outer surface of the walls 14 may be provided with a sealing material 16 such as a mastic to fill irregularities in the surface of a duct in which the outer pressure member 25 is positioned. The walls 14 of the sealing envelope 13 of the outer pressure member 25 may be provided with a hole through which a probe is placed and through which the pressurising air 15 is introduced (not shown in the drawing for clarity). This hole may be sealed by gel for example. This is described in the earlier applications WO 92/19034, WO 93/03302, and PCT application PCT/GB93/01810, as mentioned above.

FIG. 4 shows a series of steps (A to I) showing the positioning of the device of FIGS. 1 and 2 on a cable 17 and insertion into the outer pressure member 25 of FIG. 3. The device 1 is shown in a substantially flat orientation in diagram A, and in diagram B the leaves 3 and 4 of the device have been separated slightly from each other and a first of the release papers 8' has been removed from the first of the mastic leaves 3. Lubricating oil 10 is then added to the surface of the mastic leaf 3, as illustrated in diagram C. Next, as shown in step D, the other release paper 8" is released from leaf 4 and again as shown in diagram E lubricating oil 10 is added to the surface of that bared mastic leaf 4. In step F lubricating oil 10 is also added to the bare surface of the plastic support strip 2. In step G the device 1 of the earlier Figures has been secured to a first cable 12 using the tie wraps 11 shown in FIG. 1. The installation is such that one of the mastic leaves 3 extends part of the way around the circumference of the cable 17 and the other of the leaves 14 of the device 1 projects outwards from the cable 17. Three further cables 18, 19 and 20 extend adjacent to cable 17. These are shown in cut back configuration in each of FIGS. 4G, 4H, and 4I for clarity. As shown in diagram G the cable 17 and its neighbouring cables 18, 19 and 20 are surrounded by the outer pressure member 25 of FIG. 3. The next step as shown in diagram H is to slide the device 1 on the cable 17 relative to cable 17 so that it moves into the outer pressure member 25. The sliding movement is continued until the ends of the outer pressure member 25 align with the measuring lines 10 on device 1, which were illustrated in FIG. 1. The positioned device is shown in diagram I of FIG. 4. It is evident in diagram H and I of FIG. 4 that before activation of the outer pressure member 25 (by inflation of the sealing envelope 13) the leaves 3 and 4 of the device 1 extend only part of the distance out towards the outer pressure member, and do not reach it.

Figure 4A:
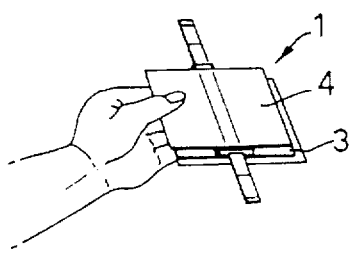
Figure 4B:
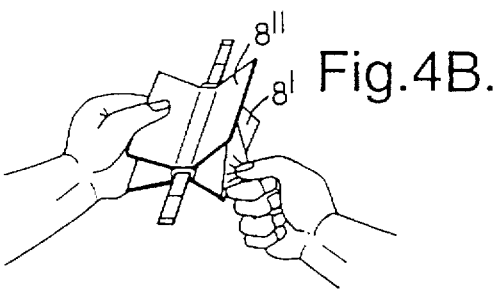
Figure 4C:
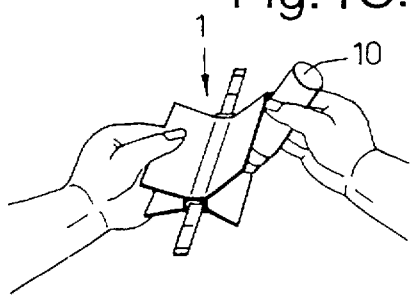
Figure 4D:
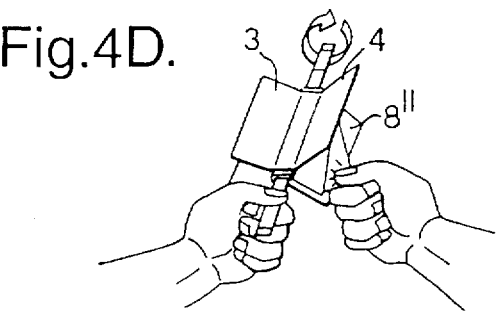
Figure 4E:
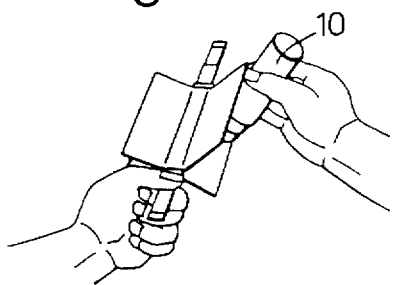
Figure 4F:
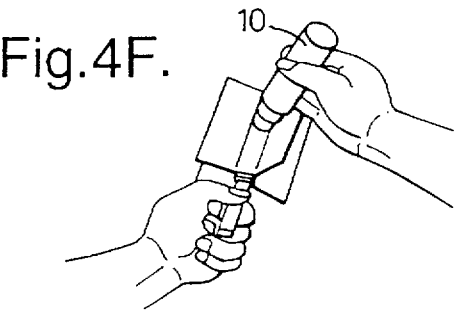
Figure 4G:
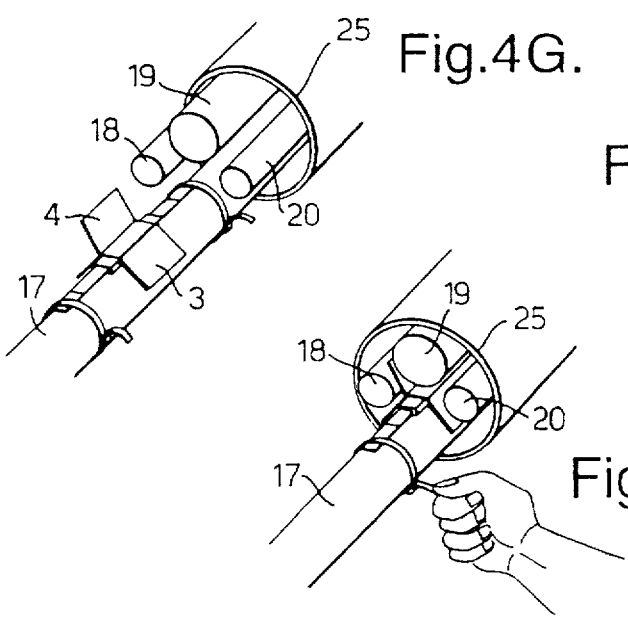
Figure 4H:
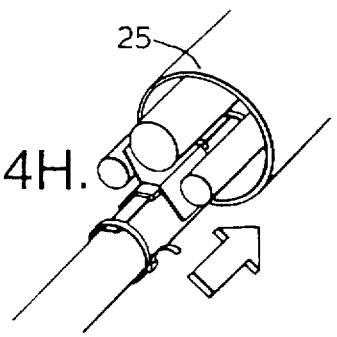

FIG. 5 is an end view showing the arrangement of FIG. 4I positioned within a duct 21, after inflation of the envelope of the outer pressure member by injection of air 15 between the walls of the envelope. It can be seen in this figure that a complete sealing block is formed by a combination of the mastic leaves 3 and 4 and the outer pressure member between each of cables 17, 18, 19 and 20 and the duct 21. In this installed position, the leaves 3, 4, have been compressed outwards (by the action of the inwardly directed force generated by the outer pressure member) and are in contact with the outer pressure member. Also the inflated envelope 13 of outer pressure member 25 has exerted an outward pressure to contact the entire internal surface of the duct wall.

Figure 6A:
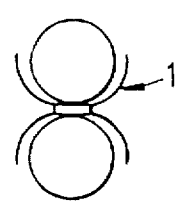
FIGS. 6A–6L show the use of the device, or devices of FIGS. 1 and 2 to provide a seal between different arrangements of between two and twelve cables.
Figure 6B:
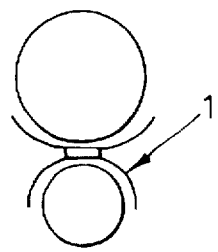
Figure 6C:
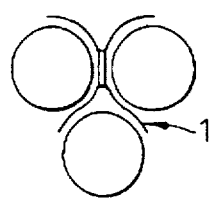
Figure 6D:
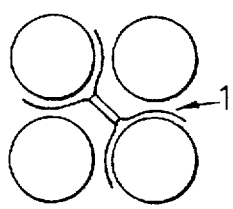
Figure 6E:
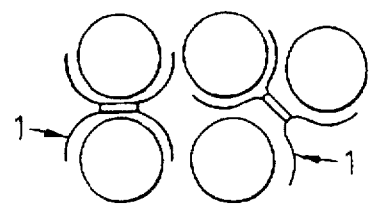
Figure 6F:
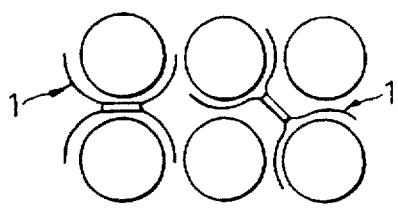
Figure 6G:
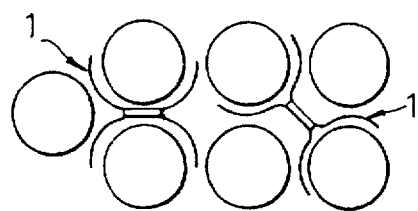
Figure 6H:
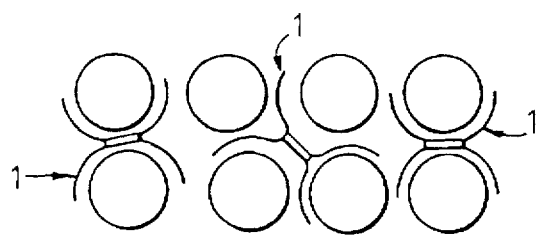
Figure 6I:
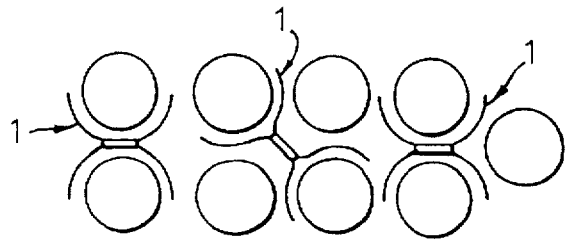
Figure 6J:
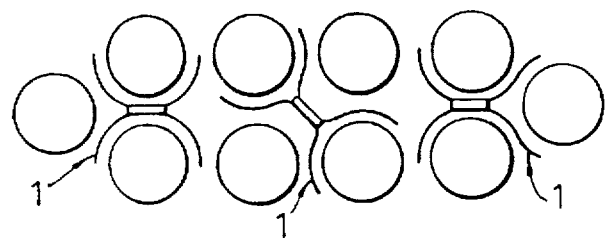
Figure 6K:
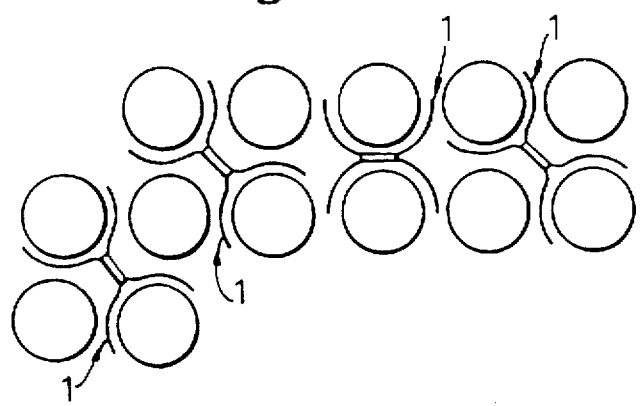
Figure 6L:
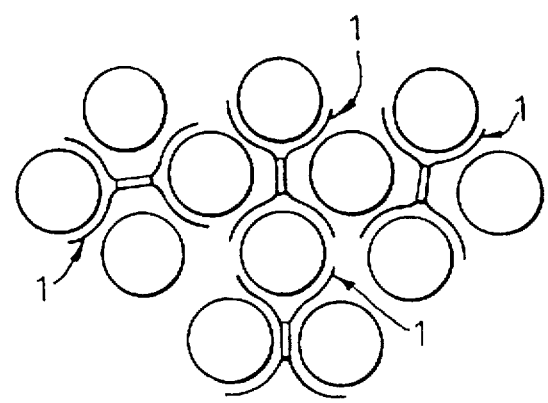

FIGS. 6A to D are schematic views showing how a single device according to the invention can be used to form a seal between two elongate substrates of the same diameter (FIG. 6A), two elongate substrates of different diameter (FIG. 6B), three elongate substrates (FIG. 6C), or four elongate substrates (FIG. 6D). FIGS. 6E to G show how two devices according to the invention can be used to form a seal between five, six and seven elongate substrates respectively. FIGS. 6H to J show how three devices according to the invention can be used to form a seal between eight, nine and ten elongate substrates respectively, and FIGS. 6K and 6L show how four devices according to the invention can be used to form a seal between eleven and twelve elongate substrates respectively. Similar designs for this number or more elongate substrates, using up to four or more of the devices according to the invention would be evident to the man skilled in the art given the general principle described in this specification.

Figure 7:
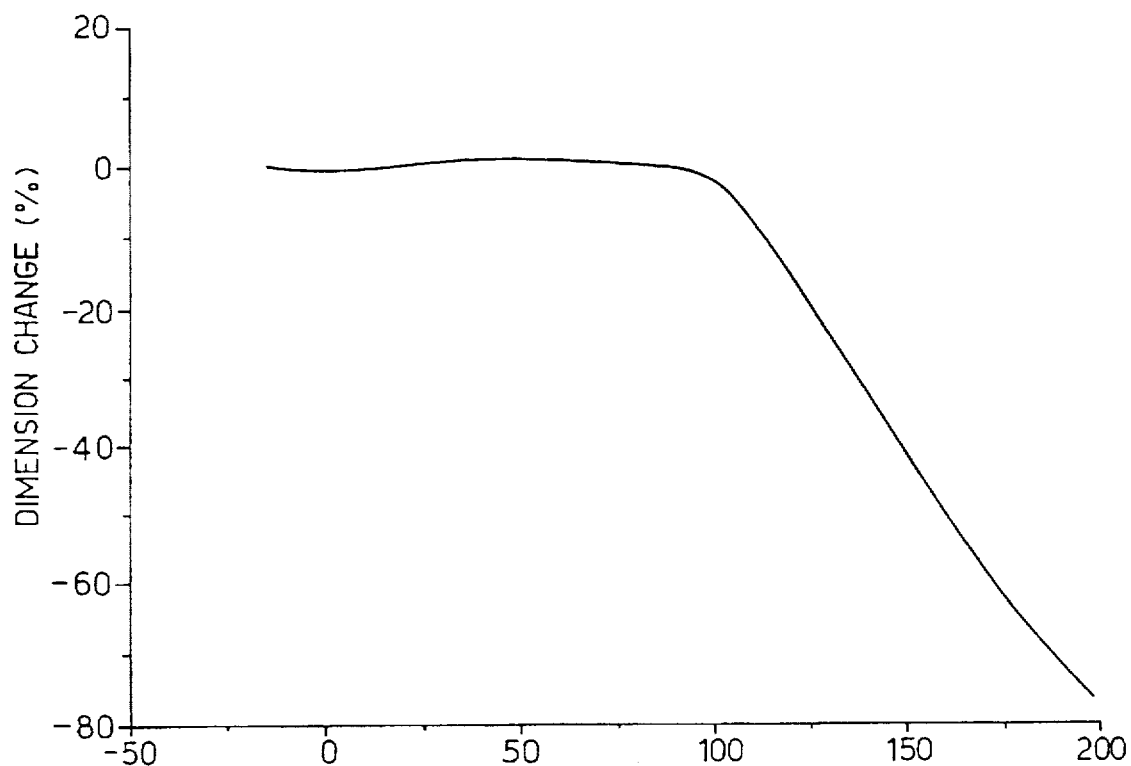
FIG. 7 is a graph showing the preferred TMA behaviour of a material for use in the device of the invention, as referred to earlier.

FIG. 7 is a TMA (thermo mechanical analysis) graph which has been referred to earlier.

I claim:

1. An environmental sealing device capable of cooperating with an outer pressure member to form a sealing block between two or more elongate substrates and a hollow housing within which the substrates extend, the device comprising:
   an elongate support member, and
   two or more elongate flexible leaves each of which comprises a sealing material that is not heat fusible and is secured by bonding to the support member, and extends laterally of the elongate support member,
   the elongate sealing device being positioned, in use, between the elongate substrates, so that a first of the flexible leaves extends at least part of the way around the periphery of a first of the elongate substrates, and a second of the flexible leaves extends at least part of the way around the periphery of a second of the elongate substrates, so that in cooperation with the action of an outer pressure member acting inwardly on the substrates and the device, and outwardly onto the housing, a sealing block is made between the elongate substrates and the housing.

2. A device according to claim 1, wherein the elongate support member is in the shape of a strip, and two flexible leaves of sealing material are bonded respectively to the first and second major surfaces of the strip.

3. A device according to claim 2, wherein a first release layer extends from the central support member to one side of the support member between the leaves and then bends back over the outer facing surface of the first of the leaves of the device, and a second release layer extends from the opposite side of the central support member between the two leaves, and then bends back on itself over the outer surface of the second of the leaves.

4. A device according to claim 1, wherein the leaves of sealing material comprise a mastic, a gel, or a rubber.

5. A method of forming an environmental sealing block between two or more elongate substrates and a hollow housing comprising the steps of:
   (i) securing an environmental sealing device to a first substrate so that a first flexible leaf of the device surrounds at least part of the periphery of a first substrate, wherein the environmental sealing device comprises an elongate support member and two or more flexible leaves secured to the support member and extending laterally from the support member, wherein said elongate leaves are formed from a material that is not heat fusible, then
   (ii) sliding the environmental sealing device relative to the first substrate into an outer pressure member within which the other substrate(s) are already present, so that a second leaf surrounds at least part of the periphery of a second substrate, and an assembly is formed, which includes the substrates, environmental sealing devices, and outer pressure member,
   (iii) positioning the assembly into a housing, and
   (iv) causing the outer pressure member to exert an inward pressure onto the assembly and an outward pressure onto the housing, thereby effecting a sealing block between the substrate(s) and the housing.

6. A method according to claim 5, wherein prior to step (iv) each of the leaves of the device(s) extends only part of the way out to the outer pressure member, but after step (iv) extends right out to the outer pressure member.

7. A method according to claim 5, of forming a sealing block between two, three or four substrates within a housing using a single of the said devices.

8. A method according to claim 5, of forming a sealing block between five, six or seven substrates within a housing using two of the said devices.

9. A method according to claim 5, of forming a sealing block between eight or more substrates within a housing using three of more of the said devices.

10. An environmental seal assembly for use in forming a seal between two or more elongate substrates, comprising:
   a hollow outer pressure member adapted to receive two or more elongate substrates; and
   an environmental sealing device adapted to be inserted within the hollow outer pressure member, said environmental sealing device further comprising:
      an elongate support member, and
      two or more elongate flexible leaves secured to the support member and extending laterally from the elongate support member, and wherein said elongate flexible leaves are formed from a material that is not heat fusible and are adapted for extending at least a portion around the elongate substrates held within the hollow outer pressure member; and
   wherein said hollow outer pressure member further comprises pressure applying means for applying pressure against the sealing device to cause outward compression of the flexible leaves.

11. An assembly according to claim 10, wherein the outer pressure member comprises an inflatable flexible envelope that can be inflated by a pressurising medium such as air.

12. An assembly according to claim 11, wherein the envelope comprises a hole through a wall in the envelope through which a probe can be positioned to inflate the envelope, and which can be sealed by a layer of gel.

* * * * *